United States Patent
Subbiah et al.

(10) Patent No.: US 11,088,908 B2
(45) Date of Patent: Aug. 10, 2021

(54) FIBRE CHANNEL OVER ETHERNET (FCOE) PINNING SYSTEM

(71) Applicant: Dell Products L.P., Round Rock, TX (US)

(72) Inventors: Ramesh Kumar Subbiah, Chennai (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 16/667,352

(22) Filed: Oct. 29, 2019

(65) Prior Publication Data
US 2021/0126827 A1  Apr. 29, 2021

(51) Int. Cl.
*H04L 12/24* (2006.01)
*H04L 12/709* (2013.01)
*H04L 29/06* (2006.01)
*H04L 12/931* (2013.01)

(52) U.S. Cl.
CPC ........ *H04L 41/0816* (2013.01); *H04L 45/245* (2013.01); *H04L 49/357* (2013.01); *H04L 69/24* (2013.01)

(58) Field of Classification Search
None
See application file for complete search history.

(56) References Cited

U.S. PATENT DOCUMENTS

| | | | |
|---|---|---|---|
| 2011/0035498 A1* | 2/2011 | Shah | H04L 12/12 709/226 |
| 2013/0100809 A1* | 4/2013 | Gale | H04L 49/357 370/235 |
| 2014/0126424 A1* | 5/2014 | Nguyen | H04L 45/245 370/255 |
| 2015/0163137 A1* | 6/2015 | Kamble | H04L 49/357 370/392 |
| 2016/0007366 A1* | 1/2016 | Li | H04L 47/58 370/329 |
| 2018/0270162 A1* | 9/2018 | Prabhakar | H04L 49/254 |

OTHER PUBLICATIONS

CISCO, "Fibre Channel over Ethernet (FCoE) Configuration and Troubleshooting Guide", pp. 1-65, Jan. 2015 (Year: 2015).*

* cited by examiner

*Primary Examiner* — Alex Skripnikov
(74) *Attorney, Agent, or Firm* — Haynes and Boone, LLP

(57) ABSTRACT

An FCoE pinning system includes a second switch device that is coupled to a first switch device via a link aggregation group (LAG). The second switch device transmits a first communication that indicates a first port that is included on the second switch device and that is coupled to a first member of the LAG has a first FCoE pinning configuration and is in a willing mode. In response to determining that a second communication received from the first switch device indicates that a second port that is included on the first switch device and that is coupled to a second member link of the LAG has a second FCoE pinning configuration, and that the first switch device is in a willing mode, the second switch device forwards, in response to determining that no mismatch exists between the FCoE pinning configurations, FCoE type traffic via the first port.

20 Claims, 20 Drawing Sheets

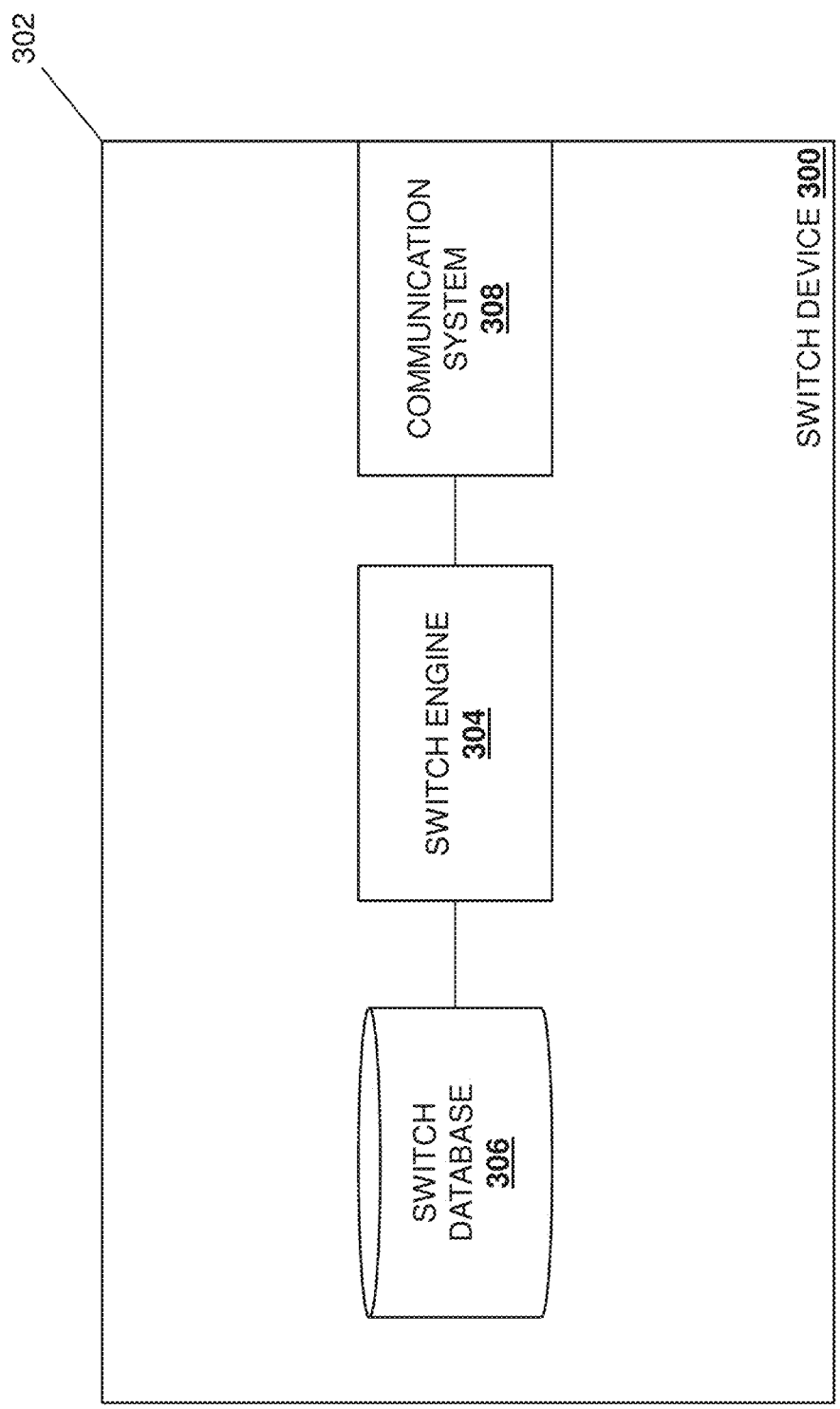

FIBRE CHANNEL OVER ETHERNET (FCOE) PINNING SYSTEM

BACKGROUND

The present disclosure relates generally to information handling systems, and more particularly to Fibre Channel over Ethernet (FCoE) pinning and pinning mismatch detection in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are utilized to provide a Fibre Channel (FC) Storage Area Network (SAN) for the storage of data. For example, an FC switch device may be utilized to couple storage systems to server systems via a Fibre Channel over Ethernet (FCoE) Forwarder (FCF) device that performs FC over Ethernet (FCoE)-to-FC protocol conversions on Ethernet communications sent from the server systems to the storage systems, as well as FC-to-FCoE protocol conversions on FC communications sent from the storage devices to the servers. Such FCF devices allow for server systems that communicate via the Ethernet protocol to be utilized with storage systems in FC SANs that communicate via the FC protocol. However, the server systems are sometimes coupled to the storage systems discussed above via switch device aggregations provided by a plurality of switch devices (e.g., FCF devices, FCoE Initialization Protocol (FIP) snooping bridge (FSB) devices, Ethernet switch devices, etc.).

For example, the Virtual Link Trunking (VLT) protocol is a proprietary aggregation protocol available in switch devices provided by Dell Inc. of Round Rock, Tex., United States, and operates to provide a redundant, load-balancing connection in a loop-free environment that eliminates the need to use the Spanning Tree Protocol (STP). The VLT protocol may be utilized in a plurality of switch devices provided between the server system and the storage system discussed above to provide a VLT switch aggregation that provides for the transmission of packets between the server systems and the storage systems. As will be appreciated by one of skill in the art in possession of the present disclosure, the VLT switch aggregation provides Active/Active LAN connectivity on converged links via the forwarding of traffic in multiple paths to multiple upstream devices without STP blocking any of the uplinks, which works for Ethernet traffic, but FCoE traffic requires dedicated links for each SAN Fabric, as FCoE traffic sent via VLT switch aggregation breaks SAN fabric isolation as discussed below.]

For example, FC sessions are provided between FC nodes, while FCoE sessions are provided between Ethernet nodes, and in order to form FC sessions or FCoE sessions, the fabric login request and fabric login reply must be provided through the same port on a switch device. However, according to the VLT protocol, when the fabric login request that was initiated by a server system and transmitted through a switch device reaches the SAN Fabric, the login accept response may be the subject of hashing operations that provide for its transmittal out of any of the ports that are included in a VLT port-channel (i.e., a VLT Link Aggregation Group (LAG)). In the event the server system receives the response via a port that is different than the port upon which the request was sent, the server system will keep retrying the request. In such situations, FC sessions or FCoE sessions that are learnt based on login accept responses will enter an unstable state that is often referred to as "flapping", and the FC sessions or FCoE sessions may keep flapping until the fabric login request and fabric login response converge (e.g., are transmitted and received) on the same port. To avoid this and to support FCoE traffic on multi-level networks that utilize the VLT protocol, port pinning is used in VLT LAGs to provide a static configuration that restricts FIP traffic and FCoE traffic to one port that is included in the port-channel in order to override the hardware LAG hashing discussed above. For example, conventional port pinning systems may classify and redirect packets exchanged during FCoE sessions to the same port (e.g., a "pinned" port) utilizing Access Control Lists (ACLs), which allow the remaining Ethernet traffic to flow through both the pinned port and other ports that are included in the port-channel based on the LAG hashing operations discussed above.

However, for a link to be pinned for FCoE traffic, both ports that provide that link must be pinned, and pinning operations for a port for the purposes of FIP traffic and FCoE traffic require an administrator to manually provide pinning commands via a command line interface (CLI). As such, mismatched FCoE pinning configurations often occur in which peer ports that provide a link are not both pinned. For example, one peer port that is included on a first switch device and that provides a first link may be pinned, while no FCoE pinning configuration may exist on the peer port that is included on the second switch device and that provides that first link, or the FCoE pinning configuration on the second switch may be provided on a port that is included on the second switch and that provides a second link that is different than the first link that is provided by the pinned port on the first switch.

Accordingly, it would be desirable to provide an improved FCoE pinning system.

SUMMARY

According to one embodiment, an Information Handling System (IHS) includes a communication system that includes a plurality of ports; a processing system coupled to the communication system; and a memory system that is coupled to the processing system and that includes instructions that, when executed by the processing system, cause the processing system to provide a switch engine that is configured to: transmit, via a port that is included in the plurality of ports and that is coupled to a member link that is coupled to a switch device and that is included in a plurality of member links that are provided in a link aggregation group, a first communication that indicates: a first port of the plurality of ports that is included on the communication system and that is coupled to a first member link that is included in the plurality of member links has a first Fiber Channel over Ethernet (FCoE) pinning configuration; and the communication system is in a willing mode that indicates the communication system is willing to update the first FCoE pinning configuration; and in response to determining that a second communication received from the switch device indicates that a second port that is included on the switch device and that is coupled to a second member link that is included in the plurality of member links has a second FCoE pinning configuration, and that the switch device is in a willing mode that indicates the switch device is willing to update the second FCoE pinning configuration: determine whether a mismatch exists between the first FCoE pinning configuration and the second FCoE pinning configuration; and forward, in response to determining that no mismatch exists between the first FCoE pinning configuration and the second FCoE pinning configuration, FCoE type traffic via the first port.

BRIEF DESCRIPTION OF THE DRAWINGS

FIG. 3 is a schematic view illustrating an embodiment of a switch device that may be included in the FCoE pinning system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
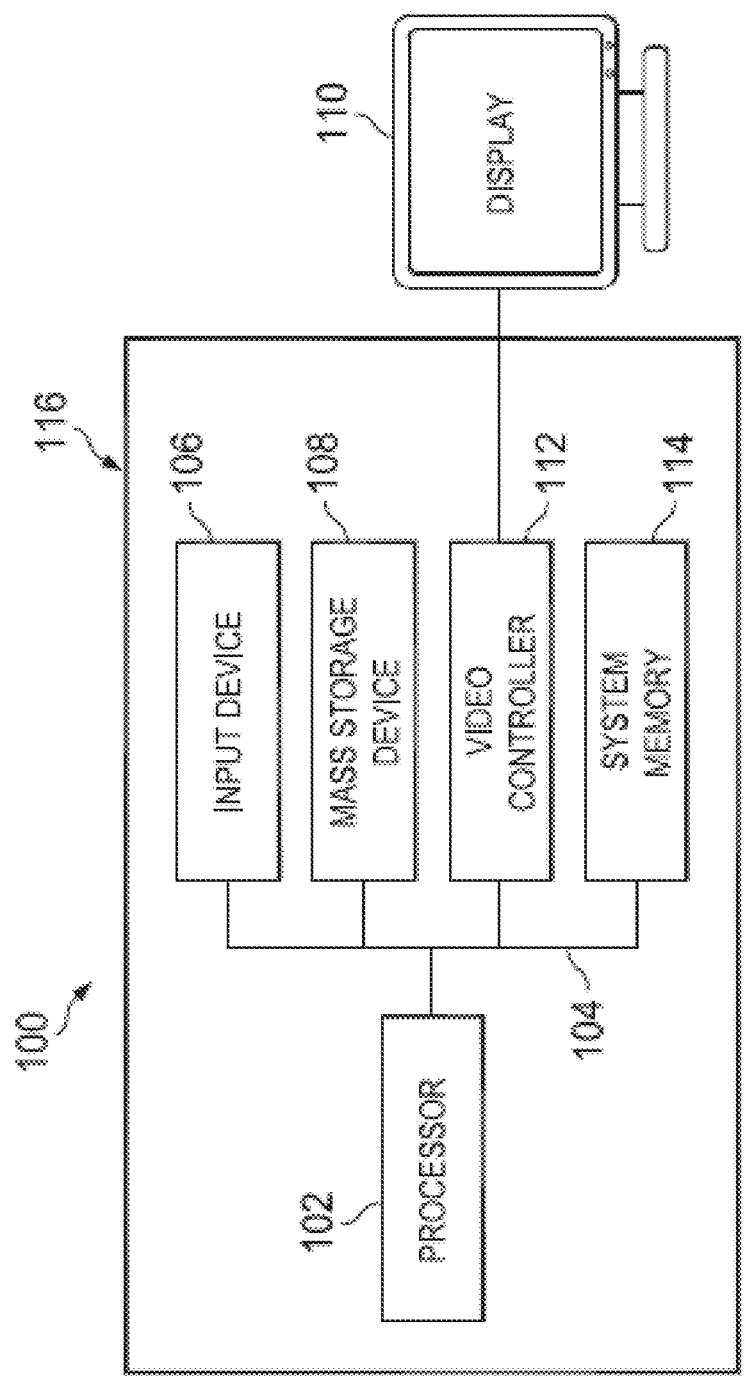
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
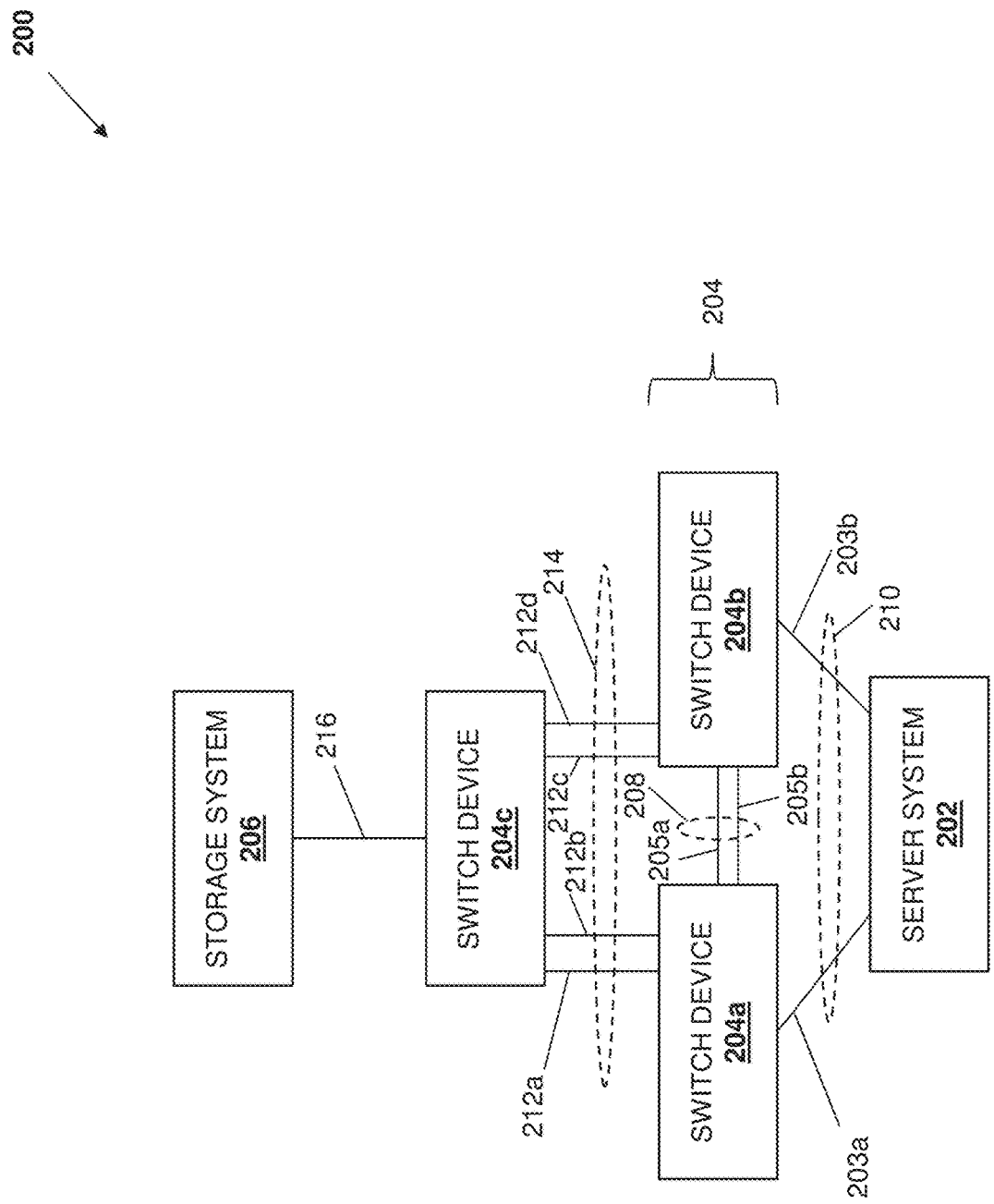
FIG. 2 is a schematic view illustrating an embodiment of a Fibre Channel over Ethernet (FCoE) pinning system.

Referring now to FIG. 2, an embodiment of an FCoE pinning system 200 is illustrated. In the illustrated embodiment, the FCoE pinning system 200 incudes a server system 202. In an embodiment, the server system 202 may be provided by the IHS 100 discussed above with reference to FIG. 1, and/or may include some or all of the components of the IHS 100. However, while illustrated and discussed as a server system 202 including one or more server devices, one of skill in the art in possession of the present disclosure will recognize that server system 202 provided in the FCoE pinning system 200 may be provided by a variety of host systems that include any devices that may be configured to operate similarly as the server system/server devices discussed below. The server system 202 may include one or more server subsystems that may include any hardware and/or software (e.g., a server device, a processing system, an application, etc.) that is configured to generate and transmit packets, as well as perform any of the other server subsystem operations described below. The server system 202 may also include one or more initiator/adapter devices, each of which is coupled to a respective server subsystem. In a specific example, initiator/adapter devices included in the server system 202 may be provided by Converged Network Adapters (CNAs), although other initiator devices and/or adapter devices will fall within the scope of the present disclosure as well.

The FCoE pinning system 200 also includes an aggregated switch system 204 that is coupled to the server system 202. In the illustrated embodiment, the aggregated switch system 204 includes the switch devices 204a and 204b. Either or both of the switch devices 204a and 204b may be provided by the IHS 100 discussed above with reference to FIG. 1, and/or may include some or all of the components of the IHS 100. In a specific embodiment, the aggregated switch system may be provided by a Virtual Link Trunking (VLT) switch system that utilizes the VLT protocol, which is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP). As such, each of the switch devices 204a and 204b may operate as VLT switch devices within a VLT domain. However, other aggregated switch systems and switch devices will fall within the scope of the present disclosure as well.

In the illustrated embodiment, the switch device 204a in the aggregated switch system 204 may be directly connected to the initiator/adapter device in the server system 202 via a link 203a, the switch device 204b in the aggregated switch system 204 may be directly connected to the initiator/adapter device in the server system 202 via link 203b, and the switch devices 204a and 204b may be connected to each other via Inter-Chassis Links (ICLs) 205a and 205b that are aggregated to form an ICL aggregation (e.g., multiple ICLs 205a and 205b that have been aggregated). In the embodiments illustrated and discussed below the ICL aggregation is described as a VLT interconnect (VLTi) 208, although other ICL aggregations may fall within the scope of the present disclosure as well. In some embodiments, the server system 202 may be coupled to an orphan port on the switch device 204a and/or to an orphan port on the switch device 204b. As will be appreciated by one of skill in the art in possession of the present disclosure, orphan ports in a VLT switch system may be ports on the VLT switch devices that are not part of the VLT (e.g., non-VLT ports), and thus are not connected to a VLT port channel provided by the VLT switch device. However, in the illustrated embodiment, the server system 202 is coupled to the switch device 204a and 204b and supports a link aggregation protocol such as the Link Aggregation Control Protocol (LACP), and thus the links 203a and 203b have been aggregated (e.g., in a VLT Link Aggregation Group (LAG)) to form a VLT port channel 210. Furthermore, the switch device 204a includes links 212a and 212b to a switch device 204c, and the switch device 202b includes links 212c and 212d to the switch device 204c, while each of those links 212a-212d have been aggregated (e.g., in a VLT Link Aggregation Group (LAG)) to form a VLT port channel 214. However, while a specific example is illustrated and described below, one of skill in the art in possession of the present disclosure will recognize that the switch devices 204a and 202b may include different numbers of links to the switch device 204c, and those links may be aggregated in the VLT LAG to form the VLT port channel 214.

The FCoE pinning system 200 also includes storage system 206 that is coupled to the switch device 204c (e.g., provided by a Fibre Channel switch device coupled to the storage system 206) via a link 216. In an embodiment, the storage system 206 may be provided by the IHS 100 discussed above with reference to FIG. 1, and/or may include some or all of the components of the IHS 100. However, while illustrated and discussed as a storage system 206 including one or more storage devices, one of skill in the art in possession of the present disclosure will recognize that storage system 206 provided in the FCoE pinning system 200 may be provided by a variety of components that include any devices that may be configured to operate similarly as the storage system/storage devices discussed below. While a specific FCoE pinning system 200 has been illustrated and described, one of skill in the art in possession of the present disclosure will recognize that the FCoE pinning system of the present disclosure may include a variety of components (e.g., additional switch devices) and component configurations while remaining within the scope of the present disclosure as well.

Referring now to FIG. 3, an embodiment of a switch device 300 is illustrated that may provide any or all of the switch devices 204a, 204b, and/or 204c discussed above with reference to FIG. 2. As such, the switch device 300 may be provided by the IHS 100 discussed above with reference to FIG. 1 and/or may include some or all of the components of the IHS 100. Furthermore, while illustrated and discussed as a VLT switch device in some of the examples below, one of skill in the art in possession of the present disclosure will recognize that the functionality of the switch device 300 discussed below may be provided by other devices (e.g., an FCF device, an FSB device, and/or other switch devices that would be apparent to one of skill in the art in possession of the present disclosure) that are configured to operate similarly as discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switch engine 304 that is configured to perform the functionality of the switch engines and/or switch devices discussed below.

The chassis 302 may also house a storage system (not illustrated, but which may include the storage 108 discussed above with reference to FIG. 1) that is coupled to the switch engine 304 (e.g., via a coupling between the storage system and the processing system) and that includes a switch database 306 that is configured to store any of the information utilized by the switch engine 304 discussed below. The chassis 302 may also house a communication system 308 that is coupled to the switch engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As will be appreciated by one of skill in the art in possession of the present disclosure, the communication system 308 in the switch device 300 may include any of the ports utilized in the manners described below. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4A:
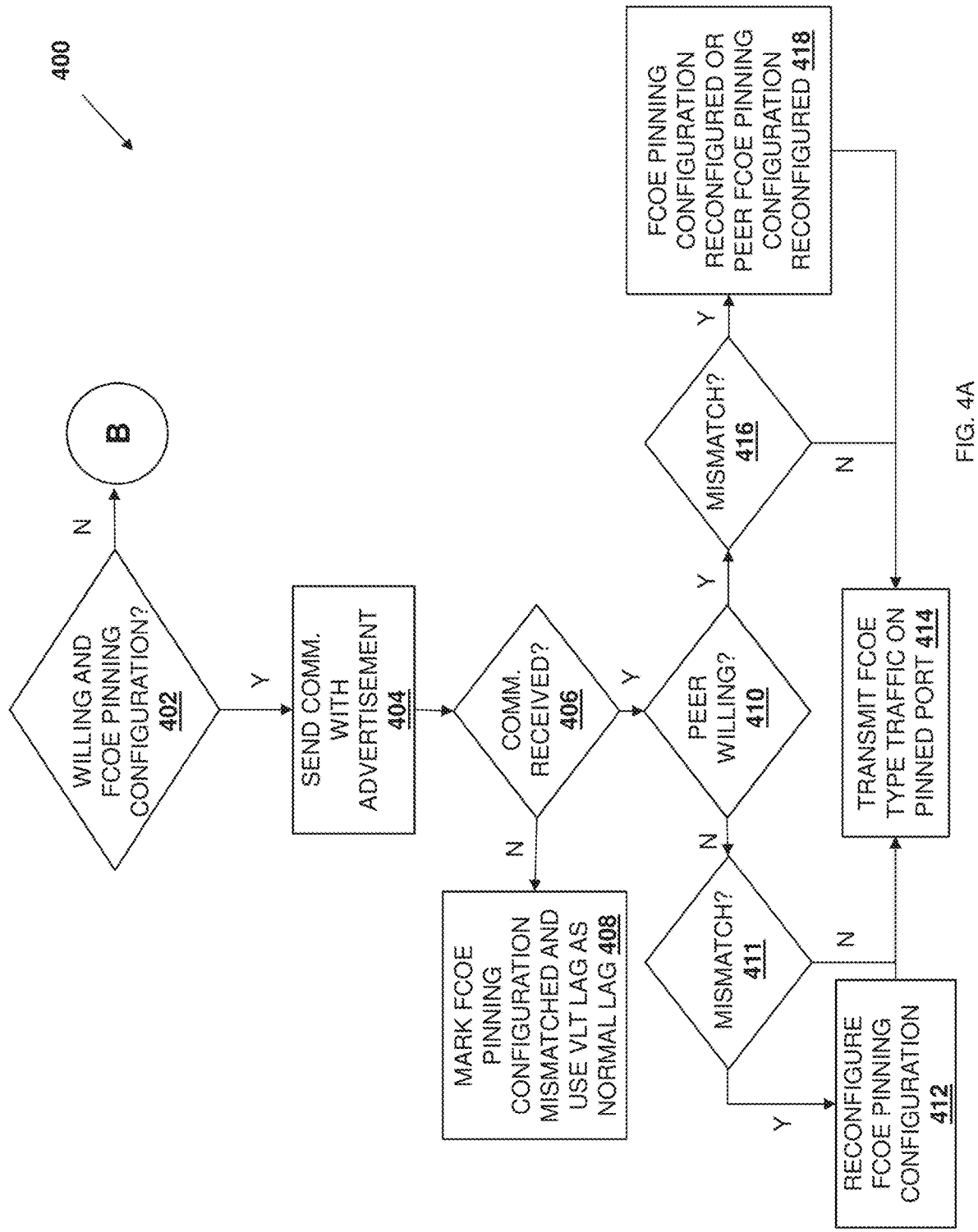
FIGS. 4A-4O are a flow chart illustrating an embodiment of a method for FCoE pinning mismatch detection and correction in a switch device that is included in a VLT topology

Referring now to FIGS. 4A-4O, an embodiment of a method 400 for FCoE pinning is illustrated. As discussed below, the systems and methods of the present disclosure may provide for the automatic detection of FCoE pinning mismatches and the automatic reconfiguration of mismatched ports to eliminate FCoE pinning mismatches between two switch devices that are coupled together via an aggregated interface (e.g., a VLT port channel, also referred to as a VLT LAG). The systems and methods of the present disclosure may also provide for the removal of an FCoE pinning configuration provided for a port on a switch device when its peer port on a peer switch device cannot be configured as a pinned port, which allows a VLT LAG that includes a link provided by those ports to operate as a VLT LAG without pinning. For example, in an FCoE pinning system including a first switch device and a second switch device that is coupled to the first switch device via a link aggregation group, with the link aggregation group including a plurality of member links between the first switch device and the second switch device, the first switch device and/or the second switch device may exchange communications that include pinning advertisements (e.g., FCoE pinning configuration Time Length Value (TLV) communications) that indicate that a port on that switch device includes an FCoE pinning configuration, as well as whether or not that switch device is willing to update a FCoE pinning configuration provided for its ports.

For example, switch devices that include an FCoE pinning configuration may send an FCoE pinning configuration TLV communication in an LLDP exchange, and advertise whether they are willing to update an FCoE pinning configuration. However, switch devices that do not include an FCoE pinning configuration will not send FCoE pinning configuration TLV communications. Furthermore, switch devices that are willing to update an FCoE pinning configuration but that do not include an FCoE pinning configuration will not send the FCoE pinning configuration TLV communication during the LLDP exchange, but will update their FCoE pinning configuration according to any FCoE pinning configuration TLV communications received during the LLDP exchange in order to match their peer switch devices, and will then operate to send an FCoE pinning configuration TLV communication in the next LLDP exchange. Further still, switch devices that are not willing to update an FCoE pinning configuration and that do not include an FCoE pinning configuration will not send FCoE pinning configuration TLV communications, which causes their peer switch devices that include FCoE pinning configurations to mark those FCoE pinning configurations as mismatched and the FCoE pinned port state will go down so that any VLT LAG between the two switch devices may operate normally. As such, FCoE pinning mismatches may be detected by peer switch devices using FCoE pinning configuration TLV communications and, in some cases, may be correctable without an administrator having to identify and correct the mismatch. Finally, an FCoE pinning configuration provided for a port may be brought down if its peer port cannot be configured with an FCoE pinning configuration.

The method 400 begins at decision block 402 where it is determined whether a first switch device, which is coupled to a second switch device via a link aggregation group that includes a plurality of member links between the first switch device and the second switch device, is in a willing mode and has an FCoE pinning configuration. In an embodiment, at decision block 402, the switch engine 304 in the switch device 204a/300 may determine whether the switch device 204a is in a willing mode and includes an FCoE pinning configuration on a port that is included in a link aggregation group (e.g., the VLT port channel 214). While method 400 is described from the perspective of the switch device 204a, one of skill in the art in possession of the present disclosure will recognize that the method 400 may also be performed by each of the switch devices 204b and/or 204c as well. In various embodiments, the willing mode may indicate either that the switch device 204a is willing to update the FCoE pinning configuration for a port on the switch device 204a, or that the switch device 204a is willing to add an FCoE pinning configuration to one of the ports on the switch device 204a. In various embodiments, a non-willing mode may indicate that the switch device 204a is not willing to update an FCoE pinning configuration for a port on the switch device 204a, and not willing to add an FCoE pinning configuration to one of the ports on the switch device 204a.

In an embodiment, the switch engine 304 in the switch device 204a/300 may determine the switch device 204a is in willing mode or non-willing mode by a configurable setting so that a user can configure one switch device, which is non-willing and the other switch device will get automatically configured due to it being willing to take on the other switch's configuration. As discussed above, one or more of the ports on the switch device 204a may be coupled to the links 212a and 212b that are included in the VLT port channel 214, and may include an FCoE pinning configuration that "pins" that port in order to, for example, restrict certain data traffic such as FIP traffic and/or FCoE traffic to that port, and/or provide a variety of other pinning functionality that would be apparent to one of skill in the art in possession of the present disclosure. As will be appreciated by one of skill in the art in possession of the present disclosure, in such a situation, Ethernet traffic may also be provided on the pinned ports or non-pinned ports, but FIP traffic and FCoE traffic will not be provided on non-pinned ports that are included in the VLT port channel 214 when there are pinned ports that are configured to transmit the FIP traffic and FCoE traffic. In one example, the switch engine 304 in the switch device 204a/300 may determine whether one the ports on the switch device 204a includes an FCoE pinning configuration by referencing a pinning table stored in the switch database 306 that identifies pinned ports (e.g., ports that include an FCoE pinning configuration) that are provided on the switch device 204a If, at decision block 402, it is determined that the switch device 204a includes an FCoE pinning configuration and the switch device 204a is in a willing mode, the method 400 then proceeds to block 404 where a communication that includes an advertisement is transmitted that indicates that the first switch device is in willing mode and has an FCoE pinning configuration. In an embodiment, at block 404, the switch engine 304 in the switch device 204a/300 may transmit a communication, which includes an advertisement that indicates that the switch device 204a is in the willing mode and has an FCoE pinning configuration, to the switch device 204c via the link 212a and/or the link 212b. In an embodiment, the communication transmitted at block 404 may be provided by Type-Length-Value (TLV) communications that is referred to below as an FCoE pinning configuration TLV communication that includes information such as, for example, an indication that there is an FCoE pinning configuration on switch device 204a, whether the switch device 204a is in a willing mode or in a non-willing mode, as well as any other information that would be apparent to one of skill in the art in possession of the present disclosure. For example, the FCoE pinning configuration TLV communication may be provided as part of an existing Data Center Bridging Capability Exchange (DCBx) TLV communication. As discussed in further detail below, the switch device 204a may only transmit the communication at block 404 when there is an FCoE pinning configuration for a port on the switch device 204a.

The method 400 then proceeds to decision block 406 where it is determined whether a communication is received from a peer switch device. In an embodiment, at decision block 406, the switch engine 304 in the switch device 204a/300 may determine whether a communication has been received from the switch device 204c that includes an advertisement indicating whether the switch device 204c is in the willing mode or non-willing mode and whether the switch device 204c has an FCoE pinning configuration. Similarly as described above, any communication determined to be received from the switch device 204c at decision block 406 may be an FCoE pinning configuration TLV communication. In some embodiments, the determining of whether the communication from the switch device 204c has been received may include the switch engine 304 monitoring a timer to determine whether a time period has lapsed subsequent to the switch engine 304 in the switch device 204a/300 transmitted its FCoE pinning configuration TLV communication, discussed above, and in the event the time period has lapsed, the switch engine 304 in the switch device 204a may determine that the communication from the switch device 204c has not been received.

If, at decision block 406, it is determined that the communication from the peer switch device has not been received, the method 400 proceeds to block 408 where the switch device marks the FCoE pinning configuration as mismatched. In an embodiment, at block 408, the switch engine 304 in the switch device 204a/300 may remove the FCoE pinning configuration for the switch device 204a. As discussed in further detail below, if the switch device 204a does not receive the FCoE pinning configuration TLV communication from its peer switch device (e.g., the switch device 204c), that may indicate that the switch device 204c is in a non-willing mode and has no FCoE pinning configuration and, as such, an FCoE pinning mismatch exists between peer ports on the switch device 204a and the switch device 204c because there is no pinned port on the switch device 204c and the switch device 204c is not willing to automatically configure its ports with an FCoE pinning configuration. Thus, the switch device 204a may mark its FCoE pinning configuration as mismatched and the FCoE pinned status will be down to prevent issues discussed above that occur with mismatched pinned ports, and instead use the VLT port channel 214 as a normal LAG for Ethernet traffic. FCoE/FIP is not sent on that port that has the mismatch.

Figure 5A:
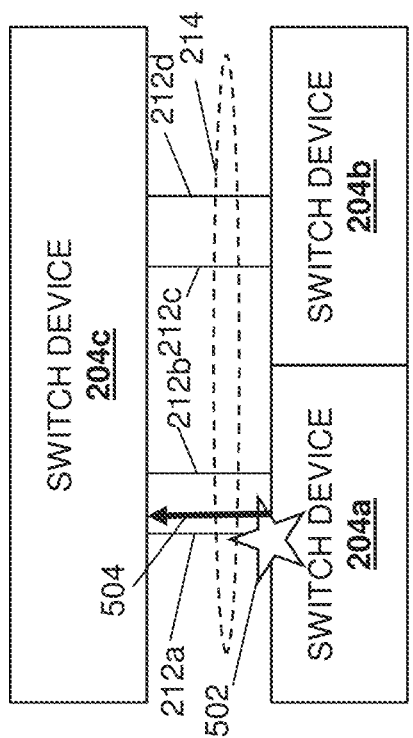
FIG. 5A is a schematic view illustrating an embodiment of the FCoE pinning system of FIG. 2 operating during the method of FIG. 4.
Figure 5B:
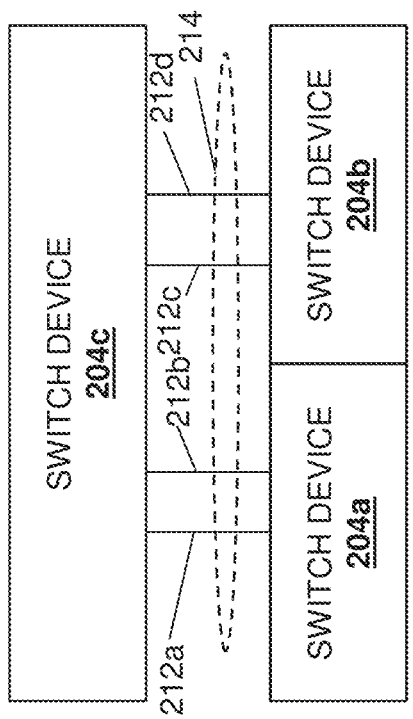
FIG. 5B is a schematic view illustrating an embodiment of the FCoE pinning system of FIG. 2 operating during the method of FIG. 4.

For example, and with reference to FIGS. 5A and 5B, the switch device 204a may have an FCoE pinning configuration 502 on the port coupled to the link 212a, and the switch device 204a may transmit the communication 504 (e.g., an FCoE pinning configuration TLV communication) to the switch device 204c and wait for a response. As illustrated in FIG. 5B, when an FCoE pinning configuration TLV communication is not received from the switch device 204c by the switch device 204a in some time period, the switch device 204a may remove the FCoE pinning configuration 502, and the VLT port channel 214 may be used for Ethernet traffic or other non-FCoE traffic.

If at decision block 406, it is determined that a communication is received, the method 400 proceeds to decision block 410 where it is determined whether the peer switch device is in a willing mode. In an embodiment, at decision block 410, the switch engine 304 in the switch device 204a/300 may determine whether the received communication (e.g., the FCoE pinning configuration TLV communication) indicates that the switch device 204c is in a willing mode by, for example, processing the FCoE pinning configuration TLV communication. The FCoE pinning configuration TLV communication may include searchable fields in a TLV information string in a TLV packet that indicate whether the switch device is in willing mode and the presence of the FCoE pinning configuration. The switch engine 304 can search these fields to determine whether switch device is in willing node and the FCoE pinning configuration If, at decision block 410, the peer switch device is not in the willing mode, then the method 400 proceeds to decision block 411 where the switch device determines whether there is a mismatch between the FCoE pinning configurations provided for the switch device and its peer switch device. In an embodiment, at decision block 411, the switch engine 304 in the switch device 204a/300 may determine whether there is a mismatch between the FCoE pinning configurations provided for the switch device 204a and the switch device 204c. For example, an FCoE pinning configuration mismatch between the switch devices 204a and 204c may be detected when the FCoE pinning configuration TLV communication includes pinning information that indicates which port on the switch device 204c is pinned or not and comparing that information to the pinned port of the switch device 204a.

If, at decision block 411, a mismatch between the FCoE pinning configurations provided for the switch device and its peer switch device is detected, the method 400 may proceed to block 412 where the switch device reconfigures its FCoE pinning configuration to match the FCoE pinning configuration provided for its peer switch device. In an embodiment, at block 412, the switch engine 304 in the switch device 204a/300 may reconfigure its FCoE pinning configuration by updating the pinning table stored in its switch database 306 to match the FCoE pinning configuration provided for the switch device 204c. For example, in response to the switch device 204c advertising to switch device 204a that it is in a non-willing mode, the switch device 204a may update its FCoE pinning configuration to correct the mismatch. The switch device 204a may then send a subsequent communication (e.g., a subsequent FCoE pinning configuration TLV communication in a subsequent LLDP exchange) that indicates the FCoE pinning configuration at the switch device 204a has changed. For example, the subsequent FCoE pinning configuration TLV communication may be sent via the port on the switch device 204a that is now pinned, through the link, and to the port that includes the FCoE pinning configuration on the switch device 204c.

The method 400 may then proceed to block 414 where FCoE traffic is transmitted on the port that includes the FCoE pinning configuration. In an embodiment, at block 414, the switch engine 304 in the switch device 204a/300 may transmit FCoE type traffic such as, for example, FIP traffic and FCoE traffic, to the switch device 204c via the port that was provided the FCoE pinning configuration. Furthermore, the switch engine 304 in the switch device 204a/300 may receive FIP traffic and/or FCoE traffic from the switch device 204c and via the port that was provided the FCoE pinning configuration. As would be apparent to one of skill in the art in possession of the present disclosure, the FCoE pinning configuration overrides hardware LAG hashing operations and restricts the FIP traffic and FCoE traffic to one port that is included in the VLT port channel 214. One of skill in the art in possession of the present disclosure will also recognize that ports that include the FCoE pinning configuration will also transmit Ethernet traffic, as Ethernet traffic is allowed to flow through both the pinned port and other ports in the VLT port channel 214 via the hardware LAG hashing operations discussed above.

Figure 6A:
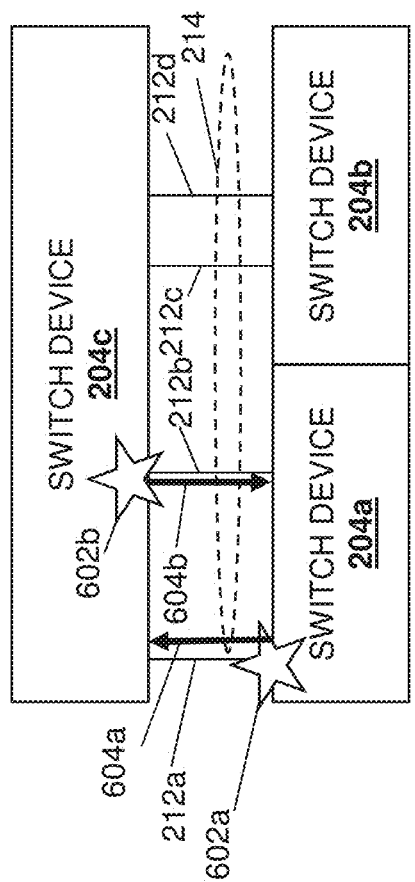
FIG. 6A is a schematic view illustrating an embodiment of the FCoE pinning system of FIG. 2 operating during the method of FIG. 4.
Figure 6B:
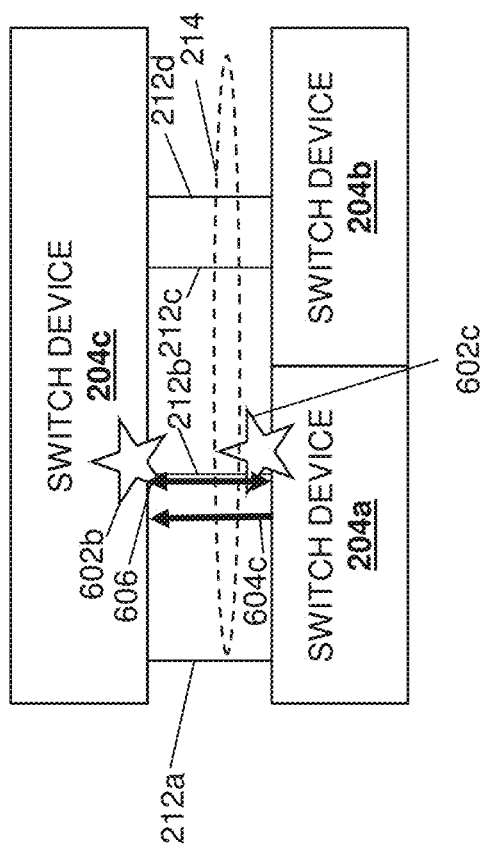
FIG. 6B is a schematic view illustrating an embodiment of the FCoE pinning system of FIG. 2 operating during the method of FIG. 4.

For example, and with reference to FIGS. 6A and 6B and blocks 406, 410, 411, 412 and 414 of method 400, the switch device 204a may have an FCoE pinning configuration 602a provided for the port coupled to the link 212a, and the switch device 204c may have an FCoE pinning configuration 602b provided for the port coupled to the link 212b. The switch device 204a may transmit the communication 604a (e.g., an FCoE pinning configuration TLV communication) to the switch device 204c, and the switch device 204c may transmit the communication 604b (e.g., an FCoE pinning configuration TLV communication) to the switch device 204a. With reference to FIG. 6B, in this embodiment the switch device 204c is in a non-willing mode, and thus the switch device 204a may update the FCoE pinning configuration 602a to an FCoE pinning configuration 602c that is provided on the port coupled to the link 212b in order to match the FCoE pinning configuration 602b, and may transmit a communication 604c to the switch device 204c that advertises the new FCoE pinning configuration 602c. As such, data traffic 606 may then be transmitted on the link 212b, with the FCoE pinning configurations 602b and 602c restricting the link 212b to FCoE type traffic (e.g., FCoE traffic and/or FIP traffic).

Referring back to decision block 411, if no mismatch between the FCoE pinning configurations provided for the switch device and its peer switch device is detected, then the method 400 proceeds to block 414 where FCoE traffic is transmitted on the port that includes the FCoE pinning configuration. In an embodiment, at block 414, the switch engine 304 in the switch device 204a/300 may transmit FCoE type traffic such as, for example, FIP traffic and/or FCoE traffic, to the switch device 204c and via the port that includes the FCoE pinning configuration. Furthermore, the switch engine 304 in the switch device 204a/300 may also receive FIP traffic and/or FCoE traffic from the switch device 204c on the port that includes the FCoE pinning configuration. As discussed above, the FCoE pinning configuration overrides the hardware LAG hashing operations discussed above and restricts the FIP traffic and/or FCoE traffic to one port that is included in the VLT port-channel 214.

Figure 7A:
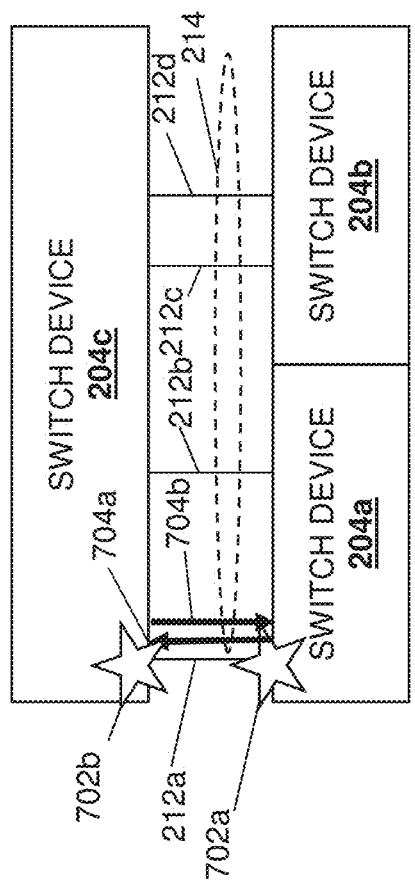
FIG. 7A is a schematic view illustrating an embodiment of the FCoE pinning system of FIG. 2 operating during the method of FIG. 4.
Figure 7B:
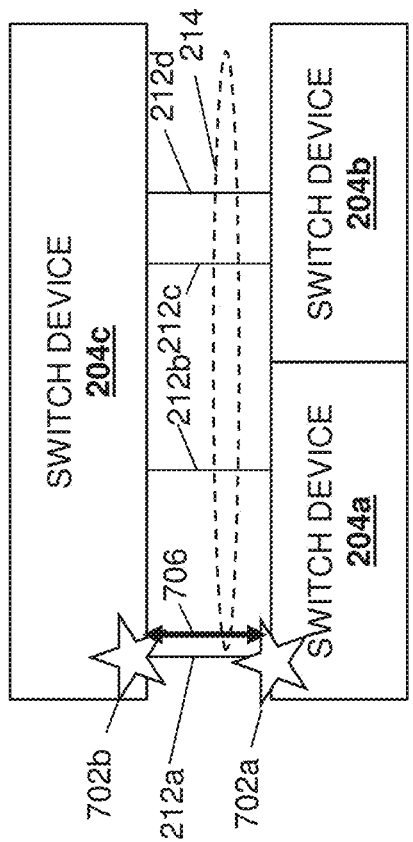
FIG. 7B is a schematic view illustrating an embodiment of the FCoE pinning system of FIG. 2 operating during the method of FIG. 4.

For example, and with reference to FIGS. 7A and 7B and blocks 406, 410, 411 and 414 of method 400, the switch device 204a may have an FCoE pinning configuration 702a provided for the port coupled to the link 212a, and the switch device 204c may have an FCoE pinning configuration 702b provided for the port coupled to the link 212a. The switch device 204a may transmit the communication 704a (e.g., an FCoE pinning configuration TLV communication) to the switch device 204c, and the switch device 204c may transmit the communication 704b (e.g., an FCoE pinning configuration TLV communication) to the switch device 204a. In this embodiment, the FCoE pinning configuration 702a and 702b are on the same link 212a and thus do not result in a mismatch. As illustrated in FIG. 7B, data traffic 706 may then be transmitted on the link 212a, with the FCoE pinning configurations 702a and 702b restricts FIP traffic and/or FCoE traffic to the link 212a.

Referring back to decision block 410, if it is determined that the peer switch device is in willing mode, then the method 400 proceeds to decision block 416 where the switch device determines whether there is a mismatch in the FCoE pinning configurations provided for the switch device and its peer switch device. In an embodiment, at decision block 416, the switch engine 304 in the switch device 204a/300 may determine whether there is a mismatch in the FCoE pinning configurations provided for the switch device 204a and the switch device 204c by, for example, determining whether the communication received from the switch device 204c was received at a different port on the switch device 204a than the port on the switch device 204a that includes the FCoE pinning configuration.

If, at decision block 416, it is determined that there is no mismatch in the FCoE pinning configurations provided for the switch device and its peer switch device, the method 400 may proceed to block 414 where FCoE traffic is transmitted on the port that includes the FCoE pinning configuration. In an embodiment, at block 414 and in response to determining there is no mismatch in the FCoE pinning configurations provided for the switch devices 204a and 204c, the switch engine 304 in the switch device 204a/300 may transmit FCoE traffic such as, for example, FIP traffic and FCoE traffic, to the switch device 204c via the port that includes the FCoE pinning configuration. Furthermore, the switch engine 304 in the switch device 204a/300 may also receive FIP traffic and FCoE traffic from the switch device 204c via the port that includes the FCoE pinning configuration. As discussed above, other data traffic such as, for example, Ethernet traffic, may be transmitted on the link that is pinned as well.

For example, and with reference to FIGS. 7A and 7B and blocks 406, 410, 416 and 414 of method 400, the switch device 204a may have the FCoE pinning configuration 702a provided for the port coupled to the link 212a, and the switch device 204c may have the FCoE pinning configuration 702b provided for the port coupled to the link 212a. The switch device 204a may transmit the communication 704a (e.g., an FCoE pinning configuration TLV communication) to the switch device 204c, and the switch device 204c may transmit the communication 704b (e.g., an FCoE pinning configuration TLV communication) to the switch device 204a that indicates that the switch device 204c is willing. In this embodiment, the FCoE pinning configurations 702a and 702b are on the same link 212a and, as such, no mismatch is detected. Thus, as illustrated in FIG. 7B, data traffic 706 may be transmitted on the link 212a, with the FCoE pinning configurations 702a and 702b restricting FCoE traffic and/or FIP traffic to the link 212a. As discussed above, the data traffic may include Ethernet traffic as well.

If, at decision block 416, it is determined that there is a mismatch between the FCoE pinning configurations provided for the switch device and its peer switch device, the method 400 may proceed to block 418 where the switch device reconfigures its FCoE pinning configuration to match the FCoE pinning configuration of its peer switch device, or its peer switch device reconfigures its FCoE pinning configuration to match the FCoE pinning configuration provided for the switch device. In an embodiment, at block 418, the switch engine 304 in the switch device 204a/300 may reconfigure the FCoE pinning configuration by updating the pinning table stored in switch database 306 in order to match the FCoE pinning configuration provided for the switch device 204c. In this embodiment, the switch device 204c advertised to the switch device 204a that it is in the willing mode, and thus the switch device 204a may update its FCoE pinning configuration to correct the mismatch. The switch device 204a may then send a subsequent communication (e.g., a subsequent FCoE pinning configuration TLV communication in a subsequent LLDP exchange) that indicates the FCoE pinning configuration provided for the switch device 204a has changed. For example, the subsequent FCoE pinning configuration TLV communication may be sent via the port on the switch device 204a that is now pinned, through the link, and to the port that includes the FCoE pinning configuration on the switch device 204c.

Alternatively, the switch engine 304 in the switch device 204c/300 may reconfigure the FCoE pinning configuration by updating the pinning table stored in the switch database 306 to match the FCoE pinning configuration provided for the switch device 204a. In this embodiment, the switch device 204a advertised to the switch device 204c that it is in the willing mode, and thus the switch device 204c may update its FCoE pinning configuration to correct the mismatch. The switch device 204c may then send a subsequent communication (e.g., a subsequent FCoE pinning configuration TLV communication in a subsequent LLDP exchange) that indicates the FCoE pinning configuration provided for the switch device 204c has changed, and that subsequent communication may be received by the switch device 204a. For example, the subsequent FCoE pinning configuration TLV communication may be sent via the port on the switch device 204c that is now pinned, through the link, and to the port that includes the FCoE pinning configuration on the switch device 204a. Thus, when there is a mismatch and both switch devices 204a and 204c are in a willing mode and include FCoE pinning configurations, the switch device that receives the FCoE pinning configuration TLV communication first will update their configuration and sends the new values in the next TLV communication. The method 400 then proceeds to block 414 as discussed above.

For example, and with reference to FIGS. 6A and 6B and blocks 406, 410, 416, 418 and 414, the switch device 204a may have the FCoE pinning configuration 602a provided for the port coupled to the link 212a, and the switch device 204c may have the FCoE pinning configuration 602b provided for the port coupled to the link 212b. The switch device 204a may transmit the communication 604a (e.g., an FCoE pinning configuration TLV communication) to the switch device 204c, and the switch device 204c may transmit the communication 604b (e.g., an FCoE pinning configuration TLV communication) to the switch device 204a. In this embodiment, both switches 204a and 204c are in the willing mode, and thus the switch devices 204a and 204c may determine which switch device 204a or 204c will change its FCoE pinning configuration based on which switch receives the FCoE pinning configuration TLV communication first. As illustrated in FIG. 6B, in one example, the switch device 204a may update the FCoE pinning configuration 602a to an FCoE pinning configuration 602c that is provided for the port that is coupled to the link 212b in order to match the FCoE pinning configuration 602b, and may transmit the communication 604c to the switch device 204c that advertises the new FCoE pinning configuration 602c. As discussed above, data traffic 606 may then be transmitted on the link 212b, with the FCoE pinning configurations 602a and 602b restricting the link 212b to FCoE traffic and/or FIP traffic. However, in other embodiments, the switch device 204c may update the FCoE pinning configuration 602b to an FCoE pinning configuration (not illustrated) provided for the port coupled to the link 212a in order to match the FCoE pinning configuration 602a, and may transmit a communication to the switch device 204a that advertises the new FCoE pinning configuration on the switch device 204c. As discussed above, data traffic may then be transmitted on the link 212a, with the FCoE pinning configurations restricting FCoE traffic and FIP traffic to the link 212a.

Referring back to decision block 402, if it is determined that the switch device is in a non-willing mode and/or does not include an FCoE pinning configuration, then the method 400 proceeds to decision block 420 where it is determined whether the switch device is willing and does not include an FCoE pinning configuration. In an embodiment, at decision block 420, the switch engine 304 in the switch device 204a/300 may determine whether the switch device 204a is in a willing mode and does not includes an FCoE pinning configuration provided for a port that is included in the link aggregation group (e.g., the VLT port channel 214). For example, the switch engine 304 in the switch device 204a/300 may determine that the switch device 204a is in willing mode by checking a willing mode enabled setting. Furthermore, the switch engine 304 in the switch device 204a/300 may determine whether ports on the switch device 204a include an FCoE pinning configuration by referencing a pinning table that is stored in the switch database 306 and that identifies a pinned port (e.g., a port that includes an FCoE pinning configuration).

If, at decision block 420, it is determined that the switch device is in a willing mode and has no FCoE pinning configuration, the method 400 then proceeds to decision block 422 where it is determined whether a communication is received from a peer switch device. In an embodiment, at decision block 422, the switch engine 304 in the switch device 204a/300 may determine whether a communication is received from the switch device 204c that includes an advertisement indicating whether the switch device 204c is in the willing mode or the non-willing mode, and indicating the switch device 204c has an FCoE pinning configuration. In this embodiment, the switch device 204a is in the willing mode and has no FCoE pinning configuration, and thus the switch device 204a does not transmit a communication to the switch device 204c during the LLDP exchange. Furthermore, the communication transmitted from the switch device 204c to the switch device 204a may be an FCoE pinning configuration TLV communication, discussed above, and in determining whether the communication is received from the switch device 204c, the switch engine 304 in the switch device 204a/300 may determine that the communication from the switch device 204c has not been received at decision block 422.

If, at decision block 422, it is determined that the communication from the peer switch device has not been received, the method 400 proceeds to block 424 where the ports on the switch device are utilized as part of the VLT port channel via LAG hashing operations in which data traffic is hashed to determine which link available via the VLT port channel is used to transmit that data traffic. In an embodiment, at block 424, the switch engine 304 in the switch device 204a/300 may utilize its ports that provide the links 212a and 212b and that are included in the VLT port channel 214 via standard LAG protocols that operate to hash data traffic to determine which of those links that are available via the VLT port channel 214 are used to transmit that data traffic. In an embodiment, in the event the switch device 204a does not receive the FCoE pinning configuration TLV communication from its peer switch device (e.g., the switch device 204c), that lack of communication may indicate that the switch device 204c has no FCoE pinning configuration. As such, in this embodiment, there is no FCoE pinning configuration on either of the switch device 204a and the switch device 204c, which will result in the switch devices 204a and 204c using the VLT port channel 214 as a normal LAG for Ethernet traffic.

If, at decision block 422, it is determined that the communication from the peer switch device has been received, the method 400 proceeds to block 426 where the switch device configures its FCoE pinning configuration to match the FCoE pinning configuration provided for its peer switch device. In an embodiment, at block 426, the switch engine 304 in the switch device 204a/300 may configure its FCoE pinning configuration by updating the pinning table stored in its switch database 306 to match the FCoE pinning configuration provided for the switch device 204c. In this embodiment, the switch device 204c advertised to switch device 204a that the switch device 204c includes an FCoE pinning configuration, and the switch device 204a may operate to update its FCoE pinning configuration to correct the mismatch that was present due to the switch device 204a not having an FCoE pinning configuration. The switch device 204a may then send a subsequent communication (e.g., a subsequent FCoE pinning configuration TLV communication in a subsequent LLDP exchange) that indicates the FCoE pinning configuration at the switch device 204a has changed. For example, the subsequent FCoE pinning configuration TLV communication may be sent via the port on the switch device 204a that is now pinned, through the link, and to the port that includes the FCoE pinning configuration on the switch device 204c.

The method 400 may then proceed to block 428 where FCoE traffic is transmitted on the port that includes the FCoE pinning configuration. In an embodiment, at block 414, the switch engine 304 in the switch device 204a/300 may transmit FCoE type traffic such as, for example, FIP traffic and/or FCoE traffic, to the switch device 204c via the port that includes the FCoE pinning configuration. Furthermore, the switch engine 304 in the switch device 204a/300 may receive FIP traffic and/or FCoE traffic from the switch device 204c via the port that includes the FCoE pinning configuration. As discussed above, the FCoE pinning configuration restricts the FCoE type traffic to one port of the VLT port-channel 214, thus overriding hardware LAG hashing operations (while still allowing Ethernet traffic that is subject to LAG hashing operations to be transmitted via that port.)

Figure 8A:
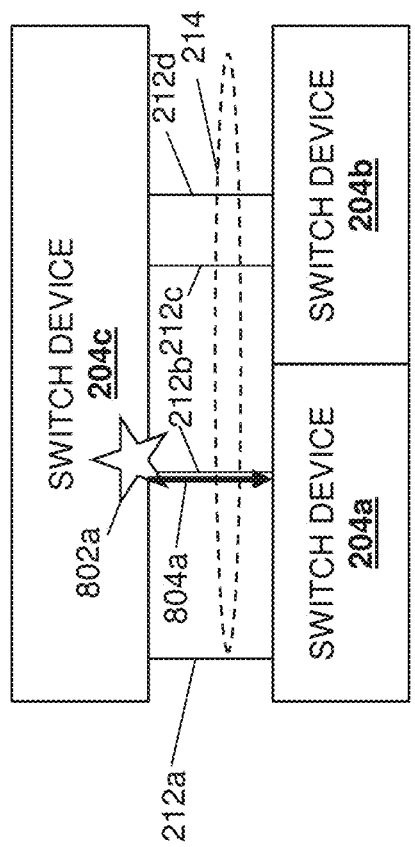
FIG. 8A is a schematic view illustrating an embodiment of the FCoE pinning system of FIG. 2 operating during the method of FIG. 4.
Figure 8B:
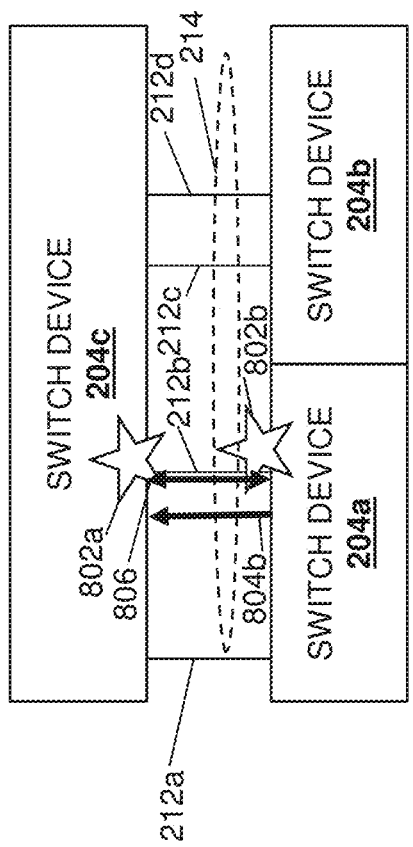
FIG. 8B is a schematic view illustrating an embodiment of the FCoE pinning system of FIG. 2 operating during the method of FIG. 4.

For example, and with reference to FIGS. 8A and 8B and blocks 422, 426, and 428 of method 400, the switch device 204a may not have an FCoE pinning configuration provided for the ports coupled to the links 212a and 212b, and the switch device 204c may have an FCoE pinning configuration 802a on the port coupled to the link 212b. The switch device 204c may transmit the communication 804a (e.g., an FCoE pinning configuration TLV communication) to the switch device 204a. As illustrated in FIG. 8B, in this embodiment, the switch device 204a is in the willing mode, and the switch device 204a may configure the port coupled to the link 212b with an FCoE pinning configuration 802b in order to match the FCoE pinning configuration 802a, and transmit the communication 804b to the switch device 204c that advertises the new FCoE pinning configuration 802b. As discussed above, data traffic 806 may then be transmitted on the link 212b, with the FCoE pinning configurations 802a and 802b restricting the link 212b to transmitting FCoE traffic and/or FIP traffic.

Referring back to decision block 420, if it is determined that the switch device is in a non-willing mode and includes an FCoE pinning configuration, or that the switch device is in a non-willing mode and does not include an FCoE pinning configuration, the method 400 proceeds to decision block 430 where it is determined whether the switch device is in a non-willing mode and includes an FCoE pinning configuration. In an embodiment, at decision block 430, the switch engine 304 in the switch device 204a/300 may determine whether the switch device 204a is in a non-willing mode and includes an FCoE pinning configuration provided for a port that is included in the link aggregation group (e.g., the VLT port channel 214). For example, the switch engine 304 in the switch device 204a/300 may determine the switch device 204a is in the non-willing mode by checking a willing mode configuration setting. The switch engine 304 in the switch device 204a/300 may also determine whether one the ports on the switch device 204a is provided with an FCoE pinning configuration by referencing a pinning table stored in its switch database 306 that identifies a pinned port (e.g., a port that includes an FCoE pinning configuration).

If, at decision block 430, it is determined that the switch device includes an FCoE pinning configuration and the switch device is in a non-willing mode, the method 400 then proceeds to block 432 where a communication is transmitted that includes an advertisement indicating that the switch device is in a non-willing mode and has an FCoE pinning configuration. In an embodiment, at block 432, the switch engine 304 in the switch device 204a/300 may transmit a communication to the switch device 204c via the one of the link 212a or the link 212b that includes the FCoE pinning configuration, with that communication including an advertisement that the switch device 204a is in the non-willing mode and has an FCoE pinning configuration. Similarly as discussed above, the communication may be provided an FCoE pinning configuration TLV communication that includes information such an indication that there is an FCoE pinning configuration on the switch device 204a, whether the switch device 204a is in the willing mode or the non-willing mode, as well as any other information that would be apparent to one of skill in the art in possession of the present disclosure.

The method 400 then proceeds to decision block 434 where it is determined whether a communication is received from a peer switch device. In an embodiment, at decision block 434, the switch engine 304 in the switch device 204a/300 may determine whether a communication has been received from the switch device 204c that includes an advertisement indicating whether the switch device 204c is in the willing mode or the non-willing mode, and indicating that the switch device 204c has an FCoE pinning configuration. Similarly as discussed above, the communication from the switch device 204c may be an FCoE pinning configuration TLV communication, discussed above. In an embodiment, the determination of whether the communication from the switch device 204c is received may include the switch engine 304 in the switch device 204a/300 monitoring a timer to determine whether a time period has lapsed subsequent to the switch engine 304 in the switch device 204a/300 transmitting its FCoE pinning configuration TLV communication. As such, if the time period has lapsed, the switch engine 304 in the switch device 204a/300 may determine that the communication from the switch device 204c has not been received.

If, at decision block 434, it is determined that the communication from the peer switch device has not been received, the method 400 proceeds to block 436 where the switch device marks its FCoE pinning configuration as mismatched. In an embodiment, at block 436, the switch engine 304 in the switch device 204a/300 may remove its FCoE pinning configuration. In an embodiment, if the switch device 204a determines that the FCoE pinning configuration TLV communication has not been received from its peer switch device (e.g., the switch device 204c), that lack of communication may indicate that the switch device 204c is in a non-willing mode and has no FCoE pinning configuration. As such, there will be an FCoE pinning configuration mismatch, as there is no pinned port on the switch device 204c and the switch device 204c is not willing to automatically configure its ports with an FCoE pinning configuration (i.e., because the switch device 204c has not responded to the communication sent by the switch device 204a.) In response, the switch device 204a may mark its FCoE pinning configuration as mismatched and the FCoE pinned status will be down to prevent the issues discussed above that may occur due to mismatched pinned ports, and use the VLT port channel 214 as a normal LAG for the transmittal of Ethernet traffic.

For example, and with reference to FIGS. 5A and 5B and blocks 434 and 436, the switch device 204a may have an FCoE pinning configuration 502 provided for the port coupled to the link 212a, and the switch device 204a may transmit the communication 504 (e.g., an FCoE pinning configuration TLV communication) to the switch device 204c and wait for a response. In this example, the communication 504 may indicate that the switch device 204a is in a non-willing mode and includes an FCoE pinning configuration, and if it is determined that an FCoE pinning configuration TLV communication is not received back from the switch device 204c (e.g., due to the switch device 204c being in the non-willing mode and having no FCoE pinning configuration), the switch device 204a may remove its FCoE pinning configuration 502 as illustrated in FIG. 5B, and the VLT port channel 214 may be used for Ethernet traffic or other non-FCoE traffic.

If, at decision block 434, it is determined that the communication from the peer switch device has been received, the method 400 proceeds to decision block 438 where the switch device determines whether there is a mismatch in the FCoE pinning configurations provided for the switch device and its peer switch device. In an embodiment, at decision block 438, the switch engine 304 in the switch device 204a/300 may determine whether there is a mismatch in the FCoE pinning configurations provided for the switch device 204a and the switch device 204c. For example, at decision block 438, the communication from the switch device 204c may be received at a different port on the switch device 204a than the port on the switch device 204a that includes the FCoE pinning configuration, which may indicate a mismatch in FCoE pinning configurations, or the communication may be received at the port on the switch device 204a that includes the FCoE pinning configuration, which may indicate no mismatch in FCoE pinning configurations.

If, at decision block 438, it is determined that there is no mismatch in the FCoE pinning configurations provided for the switch device and the peer switch device, the method 400 proceeds to block 440 where FCoE traffic is transmitted on the port that includes the FCoE pinning configuration. In an embodiment, at block 414, the switch engine 304 in the switch device 204a/300 may transmit FCoE type traffic such as, for example, FIP traffic and/or FCoE traffic, to the switch device 204c via the port that includes the FCoE pinning configuration. Furthermore, the switch engine 304 in the switch device 204a/300 may also receive data traffic (e.g., FIP traffic, FCoE traffic, Ethernet traffic) from the switch device 204c via the port that includes the FCoE pinning configuration. As discussed above, the FCoE pinning configuration restricts the FIP and/or FCoE traffic, to one port of the VLT port-channel 214, thus overriding the hardware LAG hashing operations discussed above.

For example, and with reference to FIGS. 7A and 7B and blocks 434, 438 and 440 of method 400, the switch device 204a may have an FCoE pinning configuration 702a provided for the port coupled to the link 212a, and the switch device 204c may have an FCoE pinning configuration 702b provided for the port coupled to the link 212a. The switch device 204a may transmit the communication 704a (e.g., an FCoE pinning configuration TLV communication) to the switch device 204c, and the switch device 204c may transmit the communication 704b (e.g., an FCoE pinning configuration TLV communication) to the switch device 204a. In this embodiment, the FCoE pinning configuration 702a and 702b are on the same link 212a, and thus no FCoE pinning configuration mismatch may be detected. As illustrated in FIG. 7B, data traffic 706 may then be transmitted on the link 212a, with the FCoE pinning configurations 702a and 702b restricting the link 212a to transmitting FCoE type traffic (e.g., FCoE traffic and/or FIP traffic).

If, at decision block 438, it is determined that there is a mismatch in the FCoE pinning configurations of the switch device and its peer switch device, the method 400 proceeds to decision block 442 where it is determined whether the peer switch device is in the willing mode. In an embodiment, at decision block 442, the switch engine 304 in the switch device 204a/300 may process the received communication (e.g., the FCoE pinning configuration TLV communication) to determine whether the switch device 204c is in a willing mode or not. If, at decision block 442, it is determined that the peer switch device is in non-willing mode, the method 400 may proceed to block 436 where the switch device removes its FCoE pinning configuration. For example, each of the switch device 204a and the switch device 204c may remove their FCoE pinning configurations, as both switch device 204a and 204c are in non-willing mode and include FCoE pinning configurations that are mismatched.

Figure 9A:
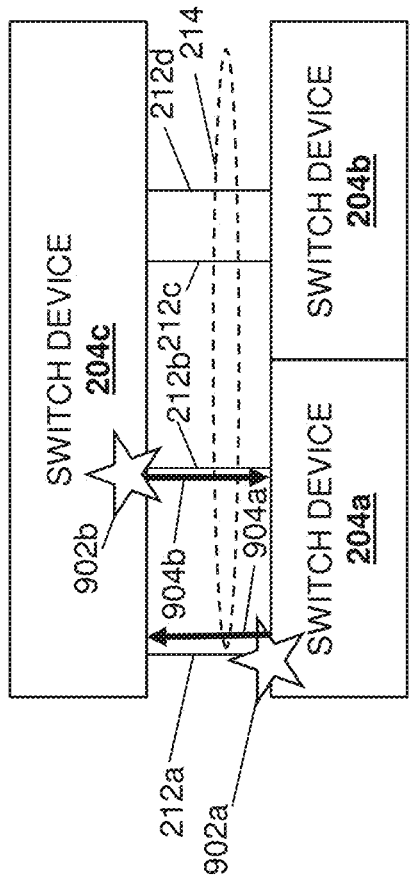
FIG. 9A is a schematic view illustrating an embodiment of the FCoE pinning system operating during the method of FIG. 4.
Figure 9B:
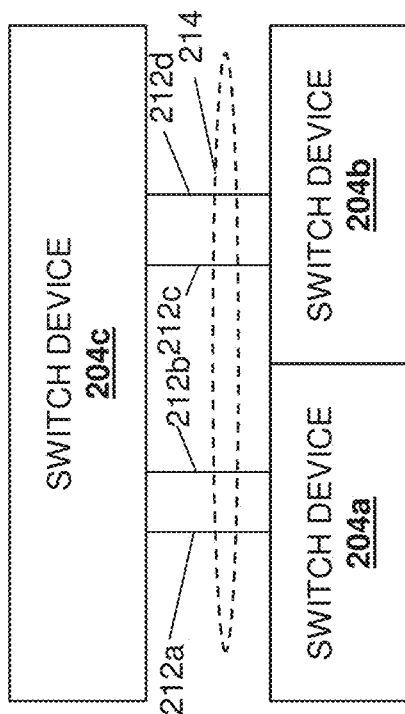
FIG. 9B is a schematic view illustrating an embodiment of the FCoE pinning system of FIG. 2 operating during the method of FIG. 4.

For example, and with reference to FIGS. 9A and 9B and blocks 434, 438, 442, and 436 of method 400, the switch device 204a may have an FCoE pinning configuration 702a provided for the port coupled to the link 212a, and the switch device 204c may have an FCoE pinning configuration 902b provided for the port coupled to the link 212b. The switch device 204a may transmit the communication 904a (e.g., an FCoE pinning configuration TLV communication) to the switch device 204c, and the switch device 204c may transmit the communication 904b (e.g., an FCoE pinning configuration TLV communication) to the switch device 204a. In this embodiment, the FCoE pinning configurations 1002a and 902b are provided for ports associated with different links, and thus there is mismatch in those FCoE pinning configurations, and with both of the switch devices 204a and 204c in the non-willing mode, that mismatch in the FCoE pinning configurations cannot be corrected. As such, as illustrated in FIG. 9B, the switch device 204a may remove the FCoE pinning configuration 902a, the switch device 204c may remove the FCoE pinning configuration 902b, and the VLT port channel 214 may be used for Ethernet traffic or other non-FCoE traffic.

If, at decision block 442, it is determined that the peer switch device is in the willing mode, the method 400 may proceed to block 444 where the switch device waits until a second communication is received from the peer switch device. In an embodiment, at block 444, the switch engine 304 in the switch device 204a/300 may determine from the communication received at decision block 434 that the switch device 204c is in the willing mode and includes an FCoE pinning configuration that is mismatched with the FCoE pinning configuration provided for the switch device 204a. In this embodiment, the switch device 204a is in the non-willing mode and the switch device 204c is in the willing mode, and thus the switch device 204a may wait for the switch device 204c to update its FCoE pinning configuration such that the FCoE pinning configuration provided for the switch device 204c matches the FCoE pinning configuration provided for the switch device 204a. The switch device 204c may then indicate that its FCoE pinning configuration has been updated by sending a subsequent FCoE pinning configuration TLV communication to the switch device 204a in a subsequent LLDP exchange with the switch device 204a that indicates the newly updated FCoE pinning configuration on the switch device 204c. The method 400 may then proceed to block 440.

Figure 10A:
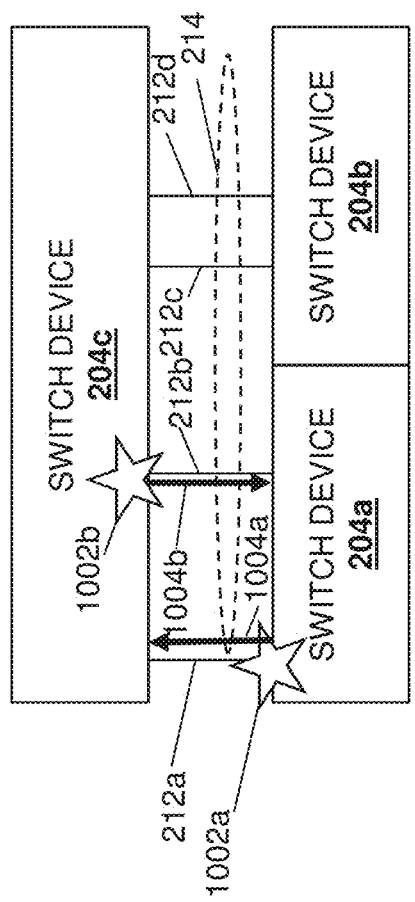
FIG. 10A is a schematic view illustrating an embodiment of the FCoE pinning system of FIG. 2 operating during the method of FIG. 4.
Figure 10B:
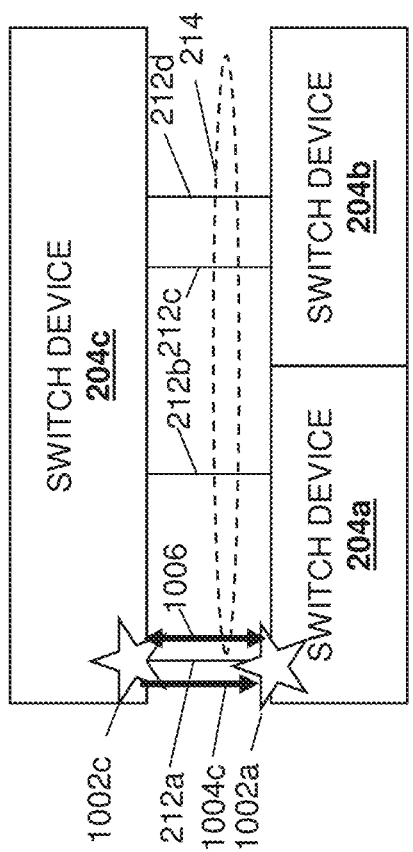
FIG. 10B is a schematic view illustrating an embodiment of the FCoE pinning system of FIG. 2 operating during the method of FIG. 4.

For example, and with reference to FIGS. 10A and 10B and blocks 434, 438, 442, 444 and 440 of method 400, the switch device 204a may have an FCoE pinning configuration 702a provided for the port coupled to the link 212a, and the switch device 204c may have an FCoE pinning configuration 1002b provided for the port coupled to the link 212b. The switch device 204a may transmit the communication 1004a (e.g., an FCoE pinning configuration TLV communication) to the switch device 204c, and the switch device 204c may transmit the communication 1004b (e.g., an FCoE pinning configuration TLV communication) to the switch device 204a. In this embodiment, the FCoE pinning configurations 1002a and 1002b are provided for ports associated with different links, and thus there is mismatch in those FCoE pinning configurations. As such, with the switch device 204a is the non-willing mode and the switch device 204c is in the willing mode, a mismatch in the FCoE pinning configurations may be corrected by the switch device 204c by, for example, the switch device 204c updating the FCoE pinning configuration 1002b to an FCoE pinning configuration 1002c to match the FCoE pinning configuration 1002a as illustrated in FIG. 10B, and transmitting a communication 1004c to the switch device 204a that advertises the new FCoE pinning configuration 1002c, as discussed above, data traffic 1006 may then be transmitted on the link 212b such that the FCoE pinning configurations 1002a and 1002b restrict the link 212a to transmitting FCoE type traffic (e.g., FCoE traffic and/or FIP traffic).

Referring back to decision block 430, if it is determined that the switch device is in a non-willing mode and does not include an FCoE pinning configuration, then the method 400 proceed to block 446 where the switch device utilizes LAG hashing operations with its ports that are included in the VLT port channel by hashing data traffic to determine which of the links that are provided by ports that are included in the VLT port channel will be used to transmit that data traffic. In an embodiment, at block 446, the switch engine 304 in the switch device 204a/300 may utilize its ports that are coupled to the links 212a and 212b and that are included in the VLT port channel 214 via LAG protocols that operate to hash data traffic to determine which of the links available via the VLT port channel 214 will be used to transmit that data traffic. In this embodiment, the switch device 204a does not include an FCoE pinning configuration and is in the non-willing mode, and thus the switch device 204a may not send an FCoE pinning configuration TLV communication to the switch device 204c (e.g., as an FCoE pinning configuration cannot be added to a port of the switch device 204a.) Thus, in the event the switch device 204c includes an FCoE pinning configuration, the switch device 204c will remove that FCoE pinning configuration as there is a mismatch in the FCoE pinning configuration that cannot be corrected.

Figure 11A:
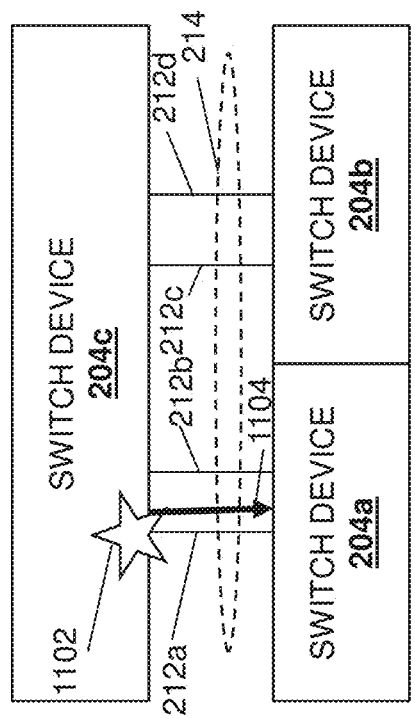
FIG. 11A is a schematic view illustrating an embodiment of the FCoE pinning system of FIG. 2 operating during the method of FIG. 4.
Figure 11B:
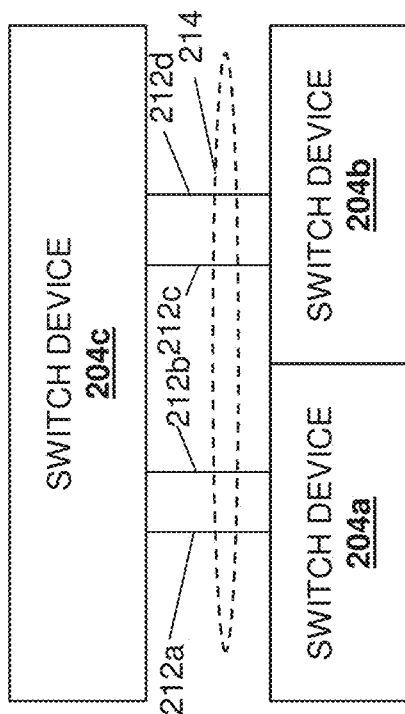
FIG. 11B is a schematic view illustrating an embodiment of the FCoE pinning system of FIG. 2 operating during the method of FIG. 4.

For example, and with reference to FIGS. 11A and 11B, the switch device 204c may have an FCoE pinning configuration 1102 provided for the port coupled to the link 212a. The switch device 204c may transmit the communication 1104 (e.g., an FCoE pinning configuration TLV communication) to the switch device 204a and wait for a response. In this embodiment, an FCoE pinning configuration TLV communication is not received at the switch device 204c due to the switch device 204a being in the non-willing mode and not having an FCoE pinning configuration, and in response the switch device 204c may remove the FCoE pinning configuration 1102 as illustrated in FIG. 11B, and the VLT port channel 214 may be used for Ethernet traffic or other non-FCoE traffic.

Thus, systems and methods have been described that provide for FCoE pinning configuration mismatch and correction for switch devices in a VLT topology. In some embodiments, switch devices that include an FCoE pinning configuration will advertise that FCoE pinning configuration and whether that switch device is in a willing mode or a non-willing mode to peer switch devices. Furthermore, switch devices that do not include an FCoE pinning configuration will not send an advertisement and will instead wait for any advertisements from peer switch devices. In the event peer switch devices includes an FCoE pinning configuration, those the peer switch devices will advertise that FCoE pinning configuration and whether that peer switch device is in a willing mode or a non-willing mode. Furthermore, peer switch devices that do not include an FCoE pinning configuration will not send an advertisement, and will instead wait for any advertisements. The switch devices and/or peer switch devices may use the advertisement (or lack of advertisements received) to detect mismatches, reconfigure FCoE pinning configurations to correct mismatches, and/or remove FCoE pinning configurations in order to minimize problems associated with mismatched FCoE pinning configurations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel over Ethernet (FCoE) pinning system, comprising:
   a first switch device; and
   a second switch device that is coupled to the first switch device via a link aggregation group that includes a plurality of member links between the first switch device and the second switch device, wherein the second switch device is configured to:
      transmit, via the link aggregation group, a first communication that indicates:
         a first port that is included on the second switch device and that is coupled to a first member link that is included in the plurality of member links has a first Fiber Channel over Ethernet (FCoE) pinning configuration; and
         the second switch device is in a willing mode that indicates the second switch device is willing to update the first FCoE pinning configuration;
      in response to determining that a second communication received from the first switch device indicates that a second port that is included on the first switch device and that is coupled to a second member link that is included in the plurality of member links has a second FCoE pinning configuration, and that the first switch device is in a willing mode that indicates the first switch device is willing to update the second FCoE pinning configuration:
         determine whether a mismatch exists between the first FCoE pinning configuration and the second FCoE pinning configuration; and
         forward, in response to determining that no mismatch exists between the first FCoE pinning configuration and the second FCoE pinning configuration, FCoE type traffic via the first port.

2. The system of claim 1, wherein the mismatch exists between the first FCoE pinning configuration and the second FCoE pinning configuration when the first member link and the second member link are not the same member link.

3. The system of claim 1, wherein the second switch device is configured to:
   negotiate, in response to determining a mismatch exists between the first FCoE pinning configuration and the second FCoE pinning configuration, with the first switch device to update the first FCoE pinning configuration or the second FCoE pinning configuration to eliminate the mismatch between the first FCoE pinning configuration and the second FCoE pinning configuration.

4. The system of claim 1, wherein the second switch device is configured to:
   in response to determining that the second communication received from the first switch device indicates that the second port that is included on the first switch device and that is coupled to the second member link that is included in the plurality of member links has the second FCoE pinning configuration, and that the first switch device is in a non-willing mode that indicates the first switch device is not willing to update the second FCoE pinning configuration, and that a mismatch exists between the first FCoE pinning configuration and the second FCoE pinning configuration:
      reconfigure the first FCoE pinning configuration to eliminate the mismatch between the first FCoE pinning configuration and the second FCoE pinning configuration by providing the first FCoE pinning configuration on a third port, which is on the second switch device and is coupled to the second member link of the plurality of member links.

5. The system of claim 1, wherein the first switch device is configured to:
   receive the first communication;
   determine that the first switch device does not have an FCoE pinning configuration and is in the willing mode that indicates the first switch device is willing to implement an FCoE pinning configuration;
   configure the second port with the second FCoE pinning configuration, wherein the second port is coupled to the first member link that is included in the plurality of member links and that is coupled to the first port; and
   transmit the second communication.

6. The system of claim 1, wherein the first switch device is configured to:
   transmit, in response to determining that the first switch device includes the second port with the second FCoE pinning configuration and is in a non-willing mode that indicates that the first switch device is not willing to update the second FCoE pinning configuration, the second communication.

7. The system of claim 1, wherein the second switch device is configured to:
   determine that the second communication from the first switch device has not arrived in a predetermined time period following the transmittal of the first communication; and
   remove the first FCoE pinning configuration from the first port.

8. The system of claim 1, wherein the first switch device is configured to:
   receive the first communication;
   determine that the first switch device does not have an FCoE pinning configuration and is in a non-willing mode that indicates the first switch device is not willing to implement an FCoE pinning configuration; and
   prevent transmission of the second communication.

9. The system of claim 1, wherein the first communication indicates that the first port that is included on the second switch device and that is coupled to first member link that is included in the plurality of member links has the first FCoE pinning configuration, and that the second switch device is in a non-willing mode that indicates the second switch device is not willing to update the first FCoE pinning configuration, wherein the second switch device is configured to:
   in response to determining that the second communication received from the first switch device indicates that the second port that is included on the first switch device and that is coupled to the second member link that is included in the plurality of member links has the second FCoE pinning configuration, and that the first switch device is in a non-willing mode that indicates the first switch device is not willing to update the second FCoE pinning configuration:
      determine whether a mismatch exists between the first FCoE pinning configuration and the second FCoE pinning configuration; and
      forward, in response to determining that no mismatch exists between the first FCoE pinning configuration and the second FCoE pinning configuration, FCoE type traffic via the first port.

10. The system of claim 9, wherein the second switch device is configured to:

remove, in response to determining that a mismatch exists between the first FCoE pinning configuration and the second FCoE pinning configuration, the first FCoE pinning configuration from the first port.

11. An Information Handling System (IHS), comprising:
a communication system that includes a plurality of ports;
a processing system coupled to the communication system; and
a memory system that is coupled to the processing system and that includes instructions that, when executed by the processing system, cause the processing system to provide a switch engine that is configured to:
  transmit, via a port that is included in the plurality of ports and that is coupled to a member link that is coupled to a switch device and that is included in a plurality of member links that are provided in a link aggregation group, a first communication that indicates:
    a first port of the plurality of ports that is included on the communication system and that is coupled to a first member link that is included in the plurality of member links has a first Fiber Channel over Ethernet (FCoE) pinning configuration; and
    the communication system is in a willing mode that indicates the communication system is willing to update the first FCoE pinning configuration; and
  in response to determining that a second communication received from the switch device indicates that a second port that is included on the switch device and that is coupled to a second member link that is included in the plurality of member links has a second FCoE pinning configuration, and that the switch device is in a willing mode that indicates the switch device is willing to update the second FCoE pinning configuration:
    determine whether a mismatch exists between the first FCoE pinning configuration and the second FCoE pinning configuration; and
    forward, in response to determining that no mismatch exists between the first FCoE pinning configuration and the second FCoE pinning configuration, FCoE type traffic via the first port.

12. The IHS of claim 11, wherein the mismatch exists between the first FCoE pinning configuration and the second FCoE pinning configuration when the first member link and the second member link are not the same member link.

13. The IHS of claim 11, wherein the switch engine is configured to:
  negotiate, in response to determining a mismatch exists between the first FCoE pinning configuration and the second FCoE pinning configuration, with the switch device to update the first FCoE pinning configuration or the second FCoE pinning configuration to eliminate the mismatch between the first FCoE pinning configuration and the second FCoE pinning configuration.

14. The IHS of claim 11, wherein the switch engine is configured to:
  in response to determining that the second communication received from the switch device indicates that the second port that is included on the switch device and that is coupled to the second member link that is included in the plurality of member links has the second FCoE pinning configuration, and that the switch device is in a non-willing mode that indicates the switch device is not willing to update the second FCoE pinning configuration, and that a mismatch exists between the first FCoE pinning configuration and the second FCoE pinning configuration:
    reconfigure the first FCoE pinning configuration to eliminate the mismatch between the first FCoE pinning configuration and the second FCoE pinning configuration by providing the first FCoE pinning configuration on a third port of the plurality of ports, which is on the communication system and is coupled to the second member link of the plurality of member links.

15. The IHS of claim 11, wherein the switch engine is configured to:
  determine that the second communication from the switch device has not arrived in a predetermined time period following the transmittal of the first communication; and
  remove the first FCoE pinning configuration from the first port.

16. A method of Fibre Channel over Ethernet pinning, comprising:
  transmitting, by a first switch device via a port that is included in the plurality of ports and that is coupled to a member link that is coupled to a switch device and that is included in a plurality of member links that are provided in a link aggregation group, a first communication that indicates:
    a first port of the plurality of ports that is included on the first switch device and that is coupled to a first member link that is included in the plurality of member links has a first Fiber Channel over Ethernet (FCoE) pinning configuration; and
    the first switch device is in a willing mode that indicates the first switch device is willing to update the first FCoE pinning configuration; and
  in response to determining that a second communication received from the second switch device indicates that a second port that is included on the second switch device and that is coupled to a second member link that is included in the plurality of member links has a second FCoE pinning configuration, and that the second switch device is in a willing mode that indicates the second switch device is willing to update the second FCoE pinning configuration:
    determining whether a mismatch exists between the first FCoE pinning configuration and the second FCoE pinning configuration; and
    forwarding, in response to determining that no mismatch exists between the first FCoE pinning configuration and the second FCoE pinning configuration, FCoE type traffic via the first port.

17. The method of claim 16, further comprising:
in response to determining that the second communication received from the second switch device indicates that the second port that is included on the second switch device and that is coupled to the second member link that is included in the plurality of member links has the second FCoE pinning configuration, and that the second switch device is in a non-willing mode that indicates the second switch device is not willing to update the second FCoE pinning configuration, and that a mismatch exists between the first FCoE pinning configuration and the second FCoE pinning configuration:
  reconfiguring, by the first switch device, the first FCoE pinning configuration to eliminate the mismatch between the first FCoE pinning configuration and the second FCoE pinning configuration by providing the first FCoE pinning configuration on a third port of the plurality of ports, which is on the first switch device and is coupled to the second member link of the plurality of member links.

18. The method of claim 16, further comprising:
   determining, by the first switch device, that the second communication from the second switch device has not arrived in a predetermined time period following the transmittal of the first communication; and
   removing, by the first switch device, the first FCoE pinning configuration from the first port.

19. The method of claim 16, wherein the first communication indicates that the first port that is included on the first switch device and that is coupled to first member link that is included in the plurality of member links has the first FCoE pinning configuration, and that the first switch device is in a non-willing mode that indicates the first switch device is not willing to update the first FCoE pinning configuration, and further comprises:
   in response to determining that the second communication received from the second switch device indicates that the second port that is included on the second switch device and that is coupled to the second member link that is included in the plurality of member links has the second FCoE pinning configuration, and that the second switch device is in a non-willing mode that indicates the second switch device is not willing to update the second FCoE pinning configuration:
      determining, by the first switch device, whether a mismatch exists between the first FCoE pinning configuration and the second FCoE pinning configuration; and
      forward, by the first switch device, in response to determining that no mismatch exists between the first FCoE pinning configuration and the second FCoE pinning configuration; FCoE type traffic via the first port.

20. The method of claim 19, further comprising:
   removing, by the first switch device and in response to determining that a mismatch exists between the first FCoE pinning configuration and the second FCoE pinning configuration, the first FCoE pinning configuration from the first port.

* * * * *

UNITED STATES PATENT AND TRADEMARK OFFICE
CERTIFICATE OF CORRECTION

PATENT NO. : 11,088,908 B2
APPLICATION NO. : 16/667352
DATED : August 10, 2021
INVENTOR(S) : Subbiah et al.

Page 1 of 1

It is certified that error appears in the above-identified patent and that said Letters Patent is hereby corrected as shown below:

In the Specification

Figure 4B:
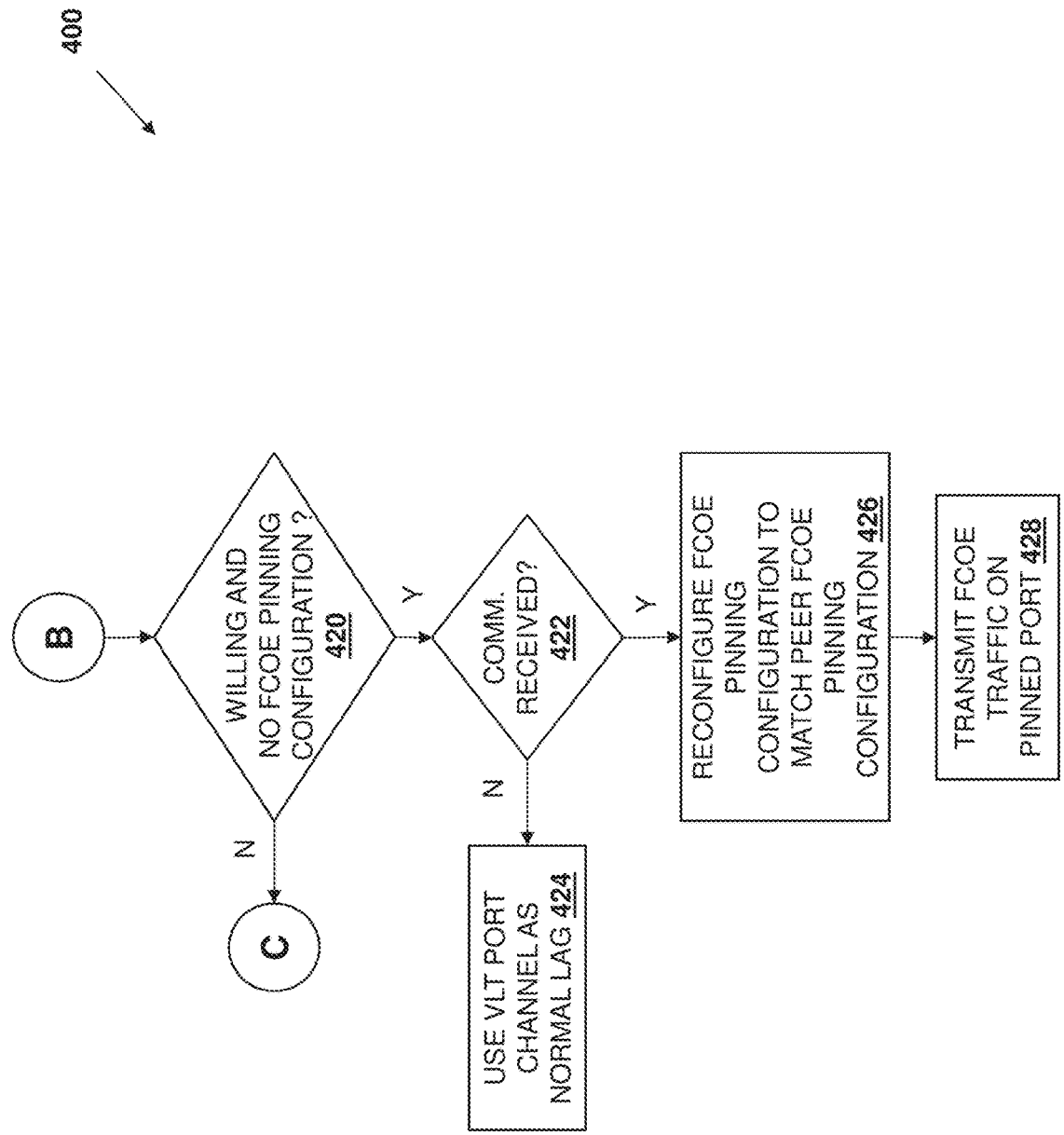
Figure 4C:
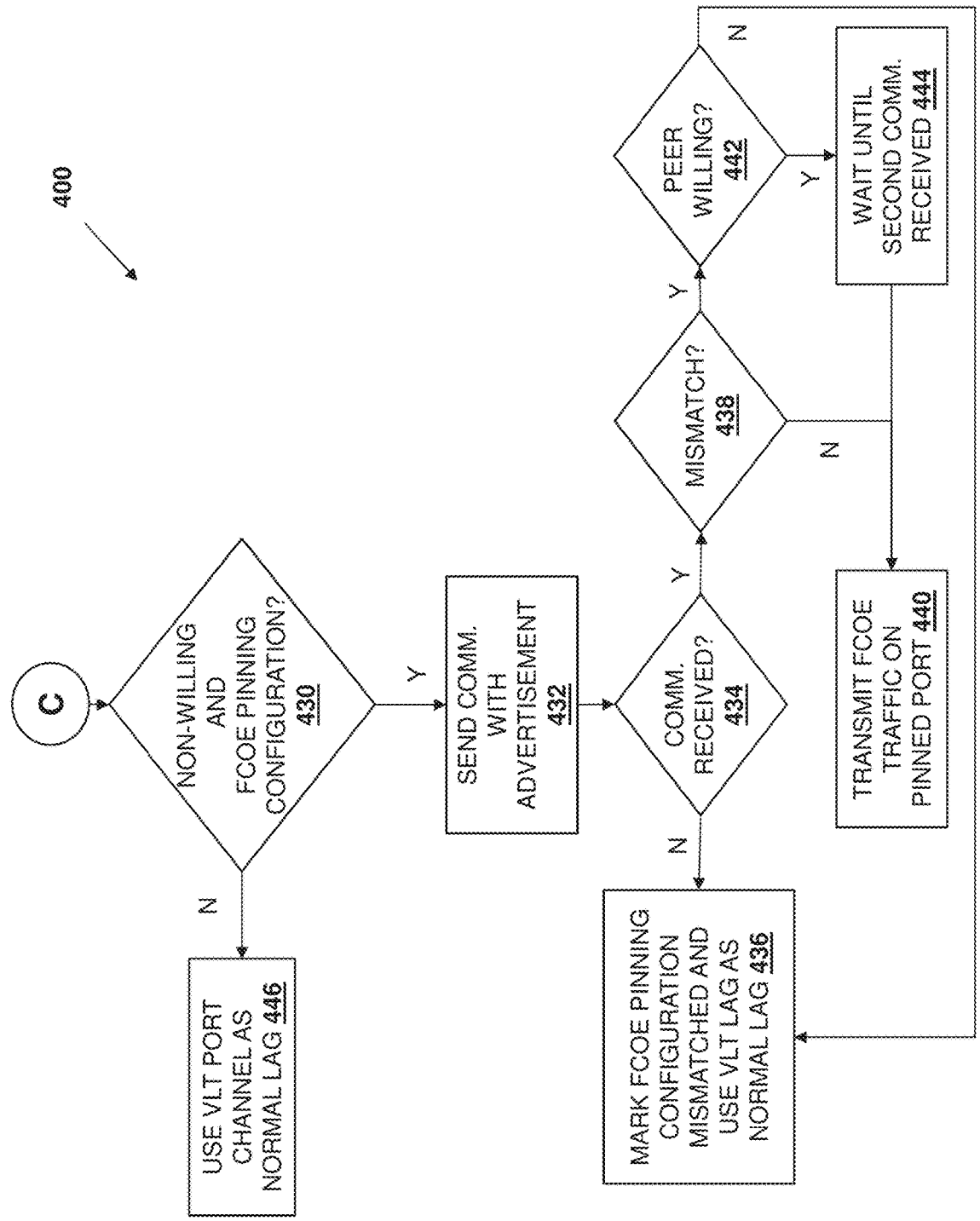

Column 3, Line 33, "FIGS. 4A-40" should be changed to --FIGS. 4A-4C--;
Column 7, Line 28, "FIGS. 4A-40" should be changed to --FIGS. 4A-4C--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*